Patented Oct. 27, 1925.

1,559,517

UNITED STATES PATENT OFFICE.

JOSEPH BRESLAUER, OF GENEVA, SWITZERLAND, AND GEORGES DARIER, OF BORDIGHERA, ITALY, ASSIGNORS TO SOCIÉTÉ D'ÉTUDES CHIMIQUES POUR L'INDUSTRIE, OF GENEVA, SWITZERLAND, A CORPORATION OF SWITZERLAND.

MANUFACTURE OF NITROGENIC AND PHOSPHATIC COMBINATIONS.

No Drawing. Original application filed September 18, 1920, Serial No. 411,074. Divided and this application filed May 29, 1925. Serial No. 33,836.

*To all whom it may concern:*

Be it known that we, JOSEPH BRESLAUER, a citizen of Switzerland, residing at Geneva, Switzerland, and GEORGES DARIER, a citizen of Switzerland, residing at Bordighera, in Italy, have invented certain new and useful Improvements in Manufacture of Nitrogenic and Phosphatic Combinations, of which the following is a specification.

Our present invention relates to a process of producing fertilizers and, more particularly, to a process of transforming crude calcium cyanamid to substances which may be mixed with other fertilizing materials, such as phosphates, in forming a complete fertilizer.

The present invention is a division of our co-pending application Serial No. 411,074, filed Sept. 18th, 1920.

Calcium cyanamid or raw cyanamid contains a quantity of free lime or of calcium weakly combined with the cyanamid which, if mixed with a soluble acid phosphate, would render the phosphate insoluble by combination with the calcium content of the raw cyanamid, and thereby render it valueless. The application of the raw cyanamid for fertilizing purposes is accordingly limited, particularly when a complete fertilizer is desired. This difficulty has been overcome in the process described in the above application, from which the present application has been divided, by transforming the raw cyanamid into free cyanamid and thence into urea or acid solutions of urea which may be mixed directly with phosphates or other fertilizing materials.

The present invention relates to modifications and improvements on the process of the above identified application and has among its objects to simplify and cheapen the process of forming a complete fertilizer and to provide a process by which the compound or mixed fertilizer may be formed in a simpler and more direct manner and in which a wide range of proportions of phosphatic and nitrogenic materials may be obtained.

With these and other objects in view, which will be apparent from the following description, the invention comprises the process described in the following specification and claims.

In our present invention, a mixed phosphatic and nitrogenic fertilizer is produced by introducing raw cyanamid in successive small portions in a finely divided state into a solution of phosphoric acid or an acid phosphate and thereby transforming the raw cyanamid into free cyanamid and then into urea while the phosphate content of the acid solution is transformed into an acid phosphate of calcium by reaction with the calcium of the raw cyanamid. The acid phosphate solution or phosphoric acid into which the raw cyanamid is mixed may contain some free cyanamid formed previously by precipitating the metallic constituents of raw cyanamid in an acid medium, such for example as a solution of carbonic acid. The acid phosphate solution may consist of a solution of an acid phosphate or of pure phosphoric acid or phosphoric acid containing sulphuric acid present in the crude acid obtained by the action of sulphuric acid on phosphates.

When it is desired to form a solution of phosphoric acid containing a quantity of free cyanamid, the free cyanamid may be formed by adding raw cyanamid in small portions to water to which carbon dioxide is applied in quantity sufficient to precipitate the metallic constituents of the raw cyanamid and to form a slightly acid solution, the water being actively stirred or agitated to keep the raw cyanamid suspended in finely divided condition so that it remains in intimate contact with the dissolved carbon dioxide and to bring the carbonic acid solution into uniform contact with the suspended raw cyanamid. During the addition of the raw cyanamid, the water is kept cool and the addition of raw cyanamid and carbon dioxide are so regulated as to precipitate the metallic constituents as rapidly as they are added and to bring the solution to substantial acidity. The precipitated insoluble salts are then removed from the solution by filtration or other suitable means and the solution may be further enriched in free cyanamid by further repeated additions of raw cyanamid and carbon dioxide and subsequent filtrations.

A solution of free cyanamid prepared as above or in other suitable manner may be used in place of pure water in forming the phosphoric acid solution and may, for this purpose, be acidified by the addition of phosphoric acid or an acid phosphate and a further quantity of finely divided raw cyanamid may be added to the resulting acid solution, the acid of the solution reacting with the calcium of the raw cyanamid to form a soluble acid phosphate. The quantities of free cyanamid, phosphoric acid and raw cyanamid may be varied to obtain any required proportions of nitrogen and phosphorus, provided the quantity of raw cyanamid is not so great as to form insoluble tricalcium phosphate. The mixture may then be heated to a temperature sufficient to transform the free cyanamid to urea, a temperature of from 60° C. to 70° C. being suitable for this purpose.

As an example, to an aqueous solution containing 44 kilograms of free cyanamid, and 98 kilograms of phosphoric acid there is added, little by little and with constant stirring, 80 kilograms of commercial calcium cyanamid.

The mass heats gradually and, when all of the calcium cyanamid has been added, it takes the form of more or less solid, moist, granules, which it is only necessary to dry and put into sacks for use. The mass represents a nitro-phosphate fertilizer containing about 20 per cent of assimilable nitrogen and 40 per cent of phosphoric acid soluble in water and in citrates in the form of mono- and bi-calcium phosphates.

The phosphoric acid in the above example may contain sulphuric acid, which serves to neutralize a portion of the calcium of the raw cyanamid forming calcium sulphate which, however, is inert and does not interfere with the use of the fertilizer.

As changes could be made within the scope of our invention, it is desired that all matter contained in the above description shall be interpreted as illustrative and not in a limiting sense.

Having described our invention, what we claim and desire to secure by Letters Patent is:

1. A process of the type described which comprises, forming a solution of free cyanamid and converging said free cyanamid in solution into unrea by means of an acid salt.

2. A process of the type described which comprises, forming a solution of free cyanamid and converging said free cyanamid in solution into urea by means of an acid salt of phosphoric acid.

3. A process of the type described which comprises, forming a solution of free cyanamid, converting said free cyanamid in solution into urea by means of an acid salt and adding a calcium phosphate to the resulting solution of urea.

4. A process of the type described which comprises, adding finely divided raw cyanamid in small portions to a solution maintained acid with an acid salt, hydrating the resulting acid solution of free cyanamid to urea and adding to the resulting acid solution a calcium phosphate to form a soluble nitro-phosphate fertilizer without isolating its constituents.

5. A process of the type described which comprises, adding finely divided raw cyanamid in small portions to a solution maintained acid with an acid salt and hydrating the resulting acid solution of free cyanamid to urea.

6. A process of the type described which comprises, forming a solution of free cyanamid and an acid agent containing a phosphate radical, adding raw calcium cyanamid to said solution little by little, and permitting the resulting mixture to heat up to transform the free cyanamid to urea, the concentration of said solution and the quantity of raw calcium cyanamid added being sufficient to form a soluble phosphate and to form moist solid granules of a combined nitrogenic and phosphatic fertilizer.

7. A process of the type described which comprises, adding finely divided raw cyanamid in small portions to a solution maintained acid with an acid salt of phosphoric acid, hydrating the resulting acid solution of free cyanamid to urea and adding to the resulting acid solution a calcium salt to form with the acid mixture a nitrophosphate fertilizer without isolating its constituents.

In testimony whereof, we affix our signatures.

JOSEPH BRESLAUER.
GEORGES DARIER.